Figure 1:
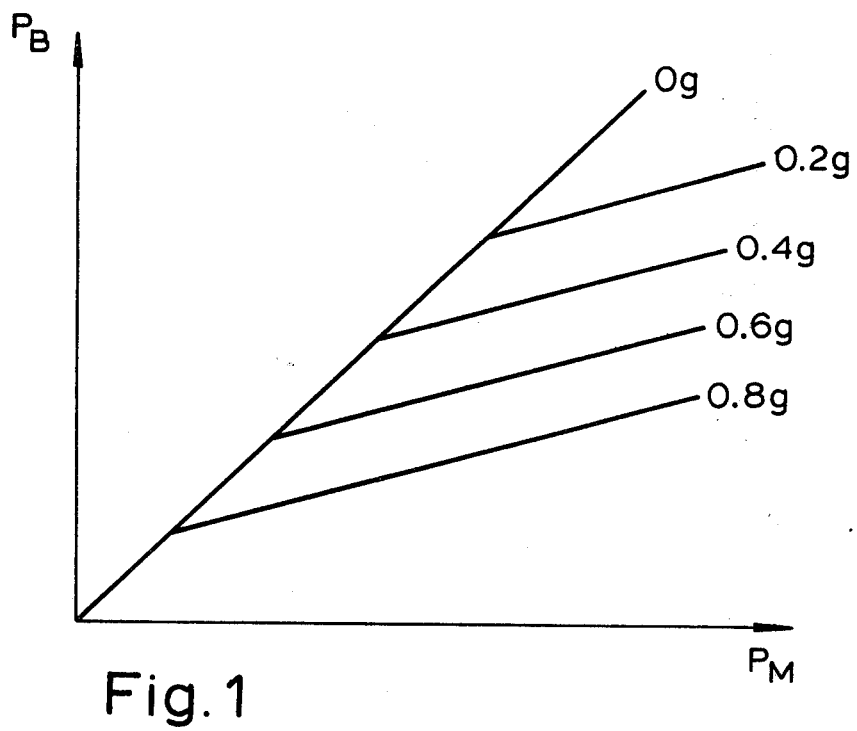

United States Patent [19]

Young

[11] 4,140,201
[45] Feb. 20, 1979

[54] VEHICLE FLUID PRESSURE BRAKING SYSTEM

[75] Inventor: Alastair J. Young, Kenilworth, England

[73] Assignee: Automotive Products Limited, Leamington Spa, England

[21] Appl. No.: 852,683

[22] Filed: Nov. 18, 1977

[30] Foreign Application Priority Data

Nov. 20, 1976 [GB] United Kingdom ............... 48520/76

[51] Int. Cl.² ............................................... B60T 8/24
[52] U.S. Cl. .................................... 180/104; 188/195;
280/88; 303/22 R
[58] Field of Search .......................... 180/103 BF, 104;
280/88, 760, 772, DIG. 1; 188/195, 192, 152;
303/22 R, 22 A, 21 CG

[56] References Cited

U.S. PATENT DOCUMENTS

| | | | |
|---|---|---|---|
| 2,152,123 | 3/1939 | Williams | 180/104 X |
| 2,209,149 | 7/1940 | Briand | 280/88 X |
| 3,059,976 | 10/1962 | Whelan | 303/22 A X |
| 3,129,035 | 4/1964 | Alfieri | 188/354 X |
| 3,475,059 | 10/1969 | Klein | 303/22 A |
| 3,848,932 | 11/1974 | Lewis | 303/22 R X |
| 3,888,328 | 6/1975 | Leiber | 180/103 BF |
| 4,030,771 | 6/1977 | Young | 180/104 X |
| 4,039,041 | 8/1977 | Farrow | 180/104 |

Primary Examiner—Joseph F. Peters, Jr.
Assistant Examiner—Terrance L. Siemens
Attorney, Agent, or Firm—Kemon & Estabrook

[57] ABSTRACT

A braking system for the front wheels of a motor vehicle. A first reducing valve is interposed between the driver's master cylinder and the brake acting on the front wheel on one side and a second reducing valve is interposed between the master cylinder and the brake acting on the front wheel on the other side. The valves are arranged so that they do not restrict braking in a straight line but a resilient linkage connected to the vehicle suspension controls braking during cornering so that the pressure to the brake on the inboard wheel is reduced. The valves give improved braking to cornering characteristics compared with previously proposed systems.

4 Claims, 6 Drawing Figures

VEHICLE FLUID PRESSURE BRAKING SYSTEM

The invention relates to a fluid pressure braking system for a vehicle having a resilient suspension system, the braking system being of a kind which comprises a driver-controlled source of fluid pressure, a first fluid pressure modulating valve interposed between the driver-controlled source and a first brake actuator which operates a brake acting on a first wheel which is on one side of the vehicle, a second fluid pressure modulating valve interposed between the driver-controlled source and a second brake actuator which operates a brake acting on a second wheel which is on the other side of the vehicle and a control mechanism responsive to vehicle suspension movements during cornering to modify the performance of one of the modulating valves so that any pressure which acts in the brake actuator associated with the inboard of said first and second wheels is lower than any pressure which acts in the brake actuator associated with the outboard of said first and second wheels.

Vehicle fluid pressure braking systems of the kind described above have been described in the specifications of my U.S. Pat. No. 4,030,771 and my U.S. patent application Ser. No. 709,607, now U.S. Pat. No. 4,111,494, both assigned to Automotive Products Limited. For braking the front wheels of the vehicle, the systems described in these specifications have used two types of valve which are based on known valves commonly used between a driver's master cylinder and the rear brakes of a vehicle. These two types are usually referred to as the cut-off or pressure limiting valve and the pressure reducing valve.

Figure 2:
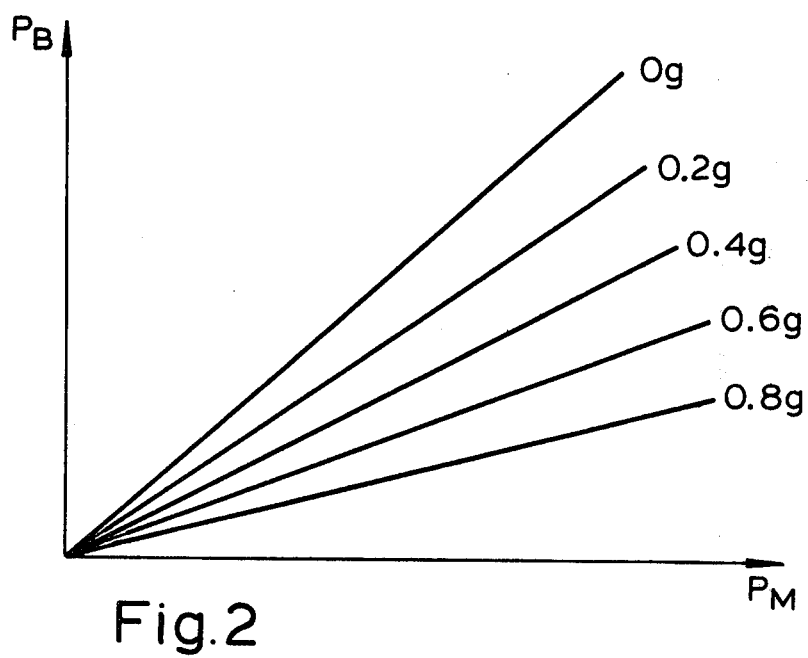
Figure 3:
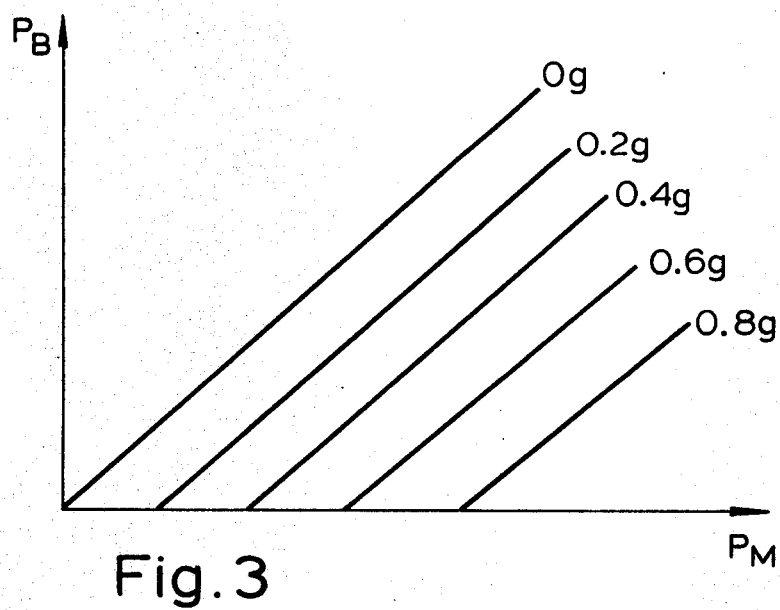
Figure 6:
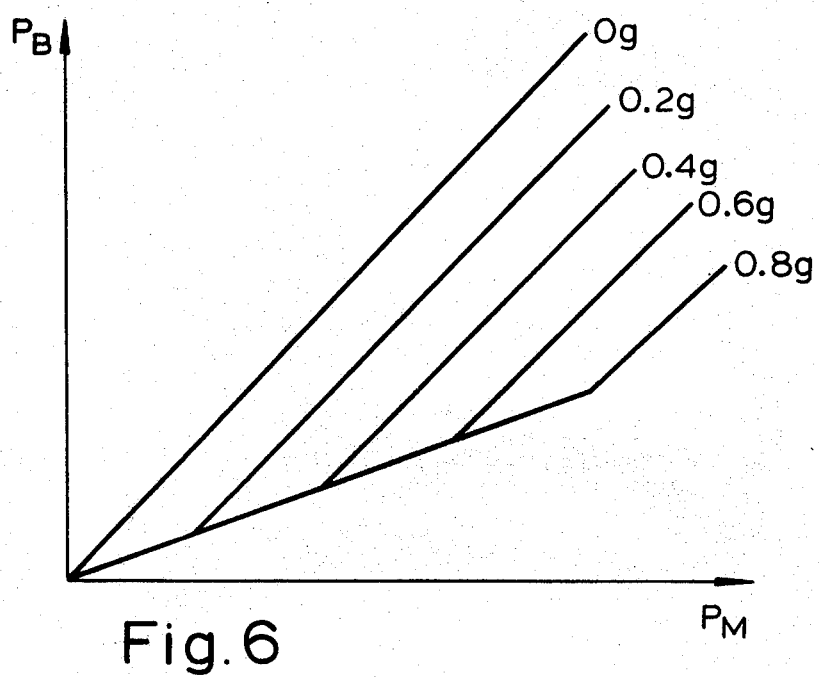
Figure 4:
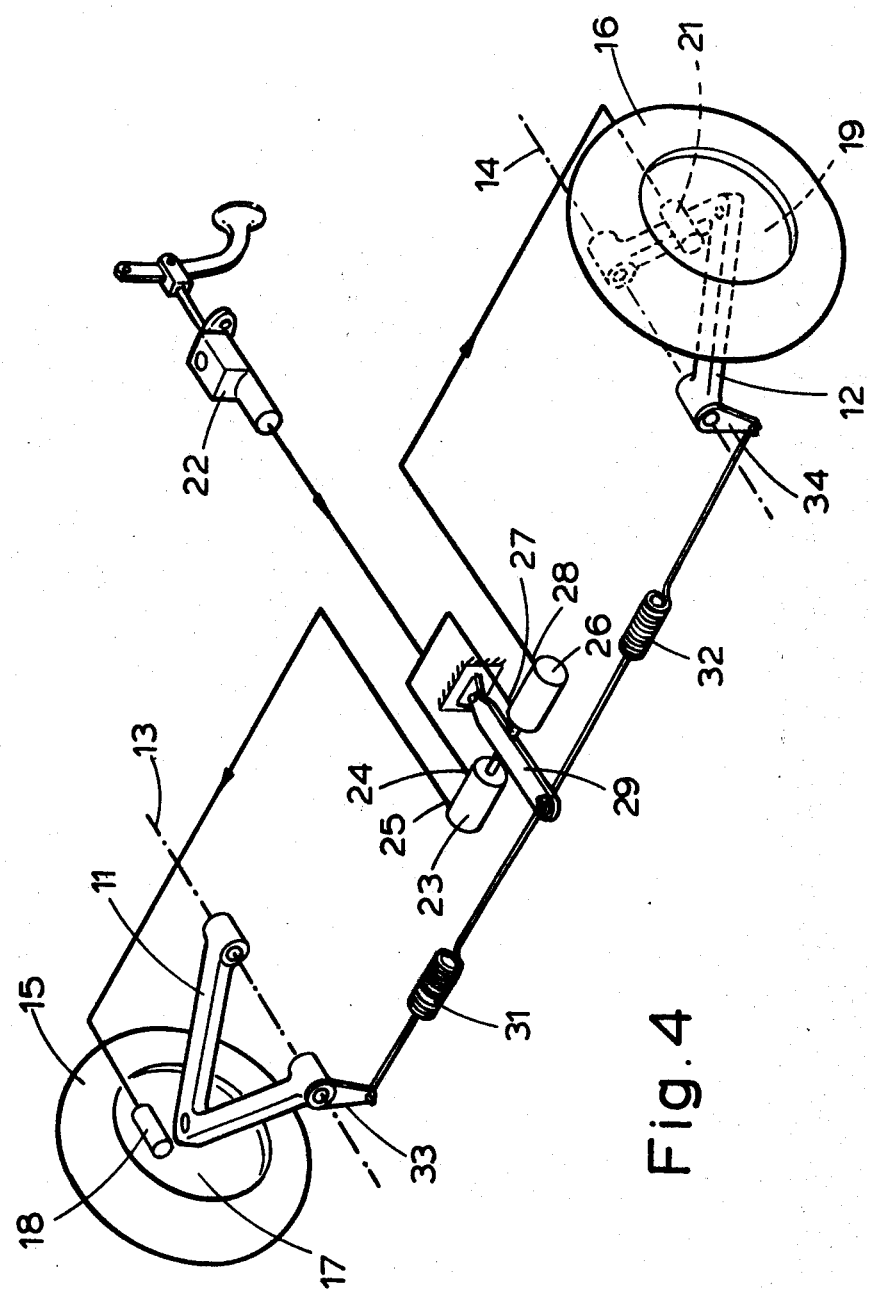
Figure 5:
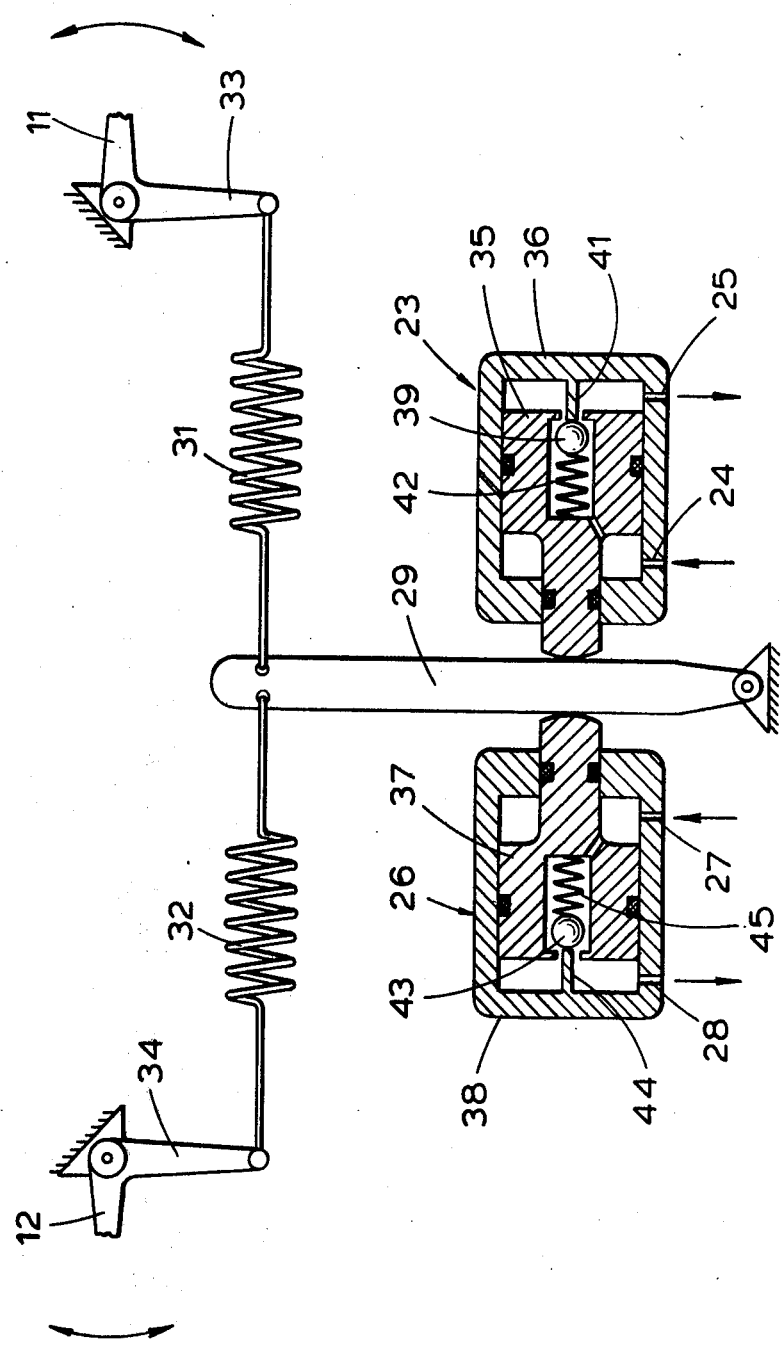

FIG. 1 is a diagram showing inboard front brake pressure ($P_b$) versus master cylinder pressure ($P_m$) of prior systems, FIG. 2 is a diagram showing the desired characteristics of the present invention relating to inboard front brake pressure versus master cylinder pressure, FIG. 3 is a diagram showing the characteristics of cut-off type valves for the front brakes of prior art systems, FIG. 4 is a diagrammatical showing of a vehicle braking system according to the present invention, FIG. 5 is a detailed sectional view of the reducing valves and the associated control lever embodying the present invention, and FIG. 6 is a diagram showing the characteristics of the braking system of the present invention of inboard brake pressure versus master cylinder pressure for various centripetal accelerations.

The systems described in the abovementioned patent applications which use pressure reducing type valves for the front brakes have a characteristic of inboard front brake pressure ($P_B$) versus master cylinder pressure ($P_M$) which is shown in FIG. 1 of the accompanying drawings whereas the desired characteristics are shown in FIG. 2 of the accompanying drawings. Each characteristic is plotted for a particular centripetal acceleration. It can be seen that these systems can be made to follow the ideal characteristics quite closely at high cornering accelerations, but that at the lowering cornering accelerations the systems represent a compromise.

On the other hand, the systems described in the abovementioned patent applications which use cut-off type valves for the front brakes have a characteristic which is shown in FIG. 3 of the accompanying drawings. With these systems the ideal characteristic is followed quite closely at the lower cornering accelerations but at the higher cornering accelerations the systems tend to underbrake the inboard wheel.

To achieve a more desirable characteristic the present invention provides for a vehicle a fluid pressure braking system comprising a first pressure reducing valve interposed between a driver-controlled source of fluid pressure and a first actuator which operates a brake acting on a first wheel which is on one side of the vehicle, a second pressure reducing valve interposed between the driver-controlled source and a second brake actuator which operates a brake acting on a second wheel which is on the other side of the vehicle, each pressure reducing valve comprising a housing, a plunger movable in the housing in one direction with respect to the housing by brake pressure acting on a relatively large piston area of the plunger and in the other direction by source pressure acting on a relatively small piston area of the plunger, movement of each plunger in the respective one direction beyond a respective predetermined position allowing a respective non-return valve to close and block communication from the source to the respective brake actuator, the reducing valves being arranged such that the plunger of each reducing valve acts to oppose movement of the plunger of the other reducing valve in the respective one direction, and a resilient linkage which is operable to bias the plunger of the first reducing valve in the respective other direction when the weight carried by the first wheel is greater than that carried by the second wheel and which is operable to bias the plunger of the second reducing valve in the respective other direction when the weight carried by the second wheel is greater than that carried by the first wheel, the plungers being dimensioned such that both non-return valves are open when the weights carried by each of the first and second wheels are equal.

The operation of the system will be apparent from the following description and from reference to FIGS. 4 to 6 of the accompanying drawings.

FIG. 4 shows, diagrammatically, a vehicle braking system according to the invention.

The braking system is incorporated in a motor vehicle having a conventionally sprung front suspension which includes a right hand (as viewed by the driver) wishbone arm 11 and a left hand wishbone arm 12. Wishbone 11 pivots about an axis 13 on the vehicle body and similarly wishbone 12 pivots about an axis 14 on the vehicle body. Springs and wheel hubs (not shown) are connected to each wishbone in a conventional manner so that wishbone 11 is connected to a first front wheel 15 and wishbone 12 is connected to a second front wheel 16. The arrangement is such that when the weight supported by each front wheel 15 or 16 is increased the associated wishbone 11 or 12 pivots upwards from its normal, generally horizontal position.

The first front wheel 15 has a brake 17 actuated by a hydraulic wheel cylinder 18 and similarly the second front wheel 16 has a brake 19 actuated by a hydraulic wheel cylinder 21. A driver controlled source of fluid pressure in the form of a brake master cylinder 22 is connected to the wheel cylinder 18 of the first front wheel 15 through a first reducing valve 23 having an inlet port 24 connected to the master cylinder 22 and an outlet port 25 connected to the wheel cylinder 18. Similarly the master cylinder 22 is connected to the wheel cylinder 21 of the second front wheel 16 through a second reducing valve 26 having an inlet port 27 connected to the master cylinder 22 and an outlet port 28 connected to the wheel cylinder 21.

The reducing valves 23 and 26 are controlled by a lever 29 which has one pivotted on the body of the vehicle and the other end connected by tension springs 31 and 32 to crank arms 33 and 34 which project in a generally vertically downwards direction from the wishbones 11 and 12 respectively. The tension springs 31 and 32 are arranged so that they retain tension when the front wheels 15 and 16 are suspended freely when the vehicle is jacked up and are of equal spring rate and preload so that the tension loads of the springs 31 and 32 cancel each other when the vertical loads carried by the front wheels 15 and 16 are equal.

FIG. 5 shows the reducing valves 23 and 26 in more detail. The first reducing valve 23 comprises a stepped plunger 35 slidable in a stepped bore in a housing 36.

The plunger 35 is movable in one direction relative to the housing 36, towards the second valve 26, by brake pressure at outlet port 25 acting on the relatively large piston area provided by the end face of the plunger 35 which is further from the second valve 26 and is movable in the other direction by master cylinder pressure at inlet port 24 acting on the relatively small annular piston area provided by the step in the plunger 35. The second reducing valve 26 is identical to the first valve 23 and comprises a stepped plunger 37 slidable in a stepped bore of housing 38. This plunger 37 is movable in one another relative to the housing 38, towards the first valve 23, by brake pressure at outlet port 28 acting on the relatively large piston area provided by the end face of the plunger 37 which is further from the first valve 23 and is movable in the other direction by master cylinder pressure at inlet port 27 acting on the relatively small annular piston area provided by the step in the plunger 37.

In the first valve 23 the plunger 36 provides a seat for a non-return valve ball 39. The ball 39 is unseated by a projection 41 in the housing 36 which lifts the ball 39 against a spring 42. Movement of the plunger 35 towards the second valve 26 beyond a predetermined position allows the ball 39 to seat and block communication from the master cylinder 22 to the wheel cylinder 18 on the first wheel 15. Similarly in the second valve 26 the plunger 37 provides a seat for a non-return valve ball 43 which is unseated by a projection 44 in the housing 38 which lifts the ball 43 against a spring 45. Movement of the plunger 37 towards the first valve 23 beyond a predetermined position allows the ball 43 to seat and block communication from the master cylinder 22 to the wheel cylinder 21 on the second wheel 16.

Both the reducing valves 23 and 26 are mounted on the body of the vehicle. The lever 29 is interposed between the adjacent ends of the plungers 35 and 37 such that the plunger 35 of the first valve 23 acts to oppose movement of the plunger 37 of the second valve 26 which is towards the second valve 26 and the plunger 37 of the second valve 26 acts to oppose movement of the plunger 35 of the first valve which is toward the second valve 26. The dimensions of the plungers are such that both non-return valve balls 38 and 43 are unseated when the lever 29 is in the central position shown in FIG. 5.

For normal straight-ahead driving, including braking and acceleration, the lever 29 does not tend to move due to the equalising action of the tension springs 31 and 32. During braking in the straight-ahead condition, the reducing valves 23 and 26 allow full master cylinder pressure to reach both front brakes since both non-return valve balls 39 and 43 are unseated by their respective projections 41 and 44.

During cornering, for example when the first front wheel 15 is the outboard wheel and thus carries the greater weight, both crank arms 33 and 34 rotate anti-clockwise (as viewed by the driver) to bias lever 29 in a clockwise direction (as viewed in plan). Whilst the plunger 35 of the first valve 23 moves away from the second valve 26 and thus keeps its non-return valve ball 39 unseated, the plunger 37 of the second valve 26 moves in the same direction, i.e. towards the first valve 23, only enough to allow ball 43 to seat. If the driver now applies the brakes, pressure is communicated to wheel cylinder 18 to operate the brake 17 on the outboard front wheel 15 through the first valve 23 without pressure loss. The second valve 26, however, now acts as a normal reducing valve with no resilient bias on the plunger so that brake pressure is reduced with respect to master cylinder pressure in proportion to the piston areas which are acted on by the brake pressure and the master cylinder pressure. Master cylinder pressure acting on the smaller, annular, piston area biases the plunger 37 away from the first valve 23 to allow fluid through to wheel cylinder 18 when the non-return valve is nudged open whereas brake pressure acts on the larger end face of the plunger 37 to bias it back towards the first valve 23 and close the non-return valve. Thus the brake pressure is reduced to maintain a force balance on the plunger 37, the non-return valve opening and closing repeatedly as master cylinder and brake pressure increase.

The second valve 16 only operates as described whilst the lever 29 is not in biassing contact with plunger 37. As master cylinder and brake pressure build up in the first valve 11, plunger 35 creates a force which is the equivalent of the master cylinder and brake pressure acting on the difference between the large and small piston areas of the plunger 35 and which moves the lever 29 anti-clockwise against the differential loading of the tension springs 31 and 32. When the lever 29 has moved enough to contact plunger 37 the characteristics of the second valve 26 are altered because there is now a biassing force equivalent to master cylinder pressure acting on the difference between the large and small piston areas of both the plungers 35 and 37 less the resilient biassing load from the tension springs 31 and 32 acting to move plunger 37 away from the first valve 23. The net effective force balance on the plunger 37 is now that of master cylinder pressure acting on the equivalent of the large piston area of the plunger 37 biassing the plunger 37 away from the first valve 23 and brake pressure acting on the same equivalent area biassing the plunger 37 in the opposite direction aided by the resilient biassing load of the tension springs 31 and 32 acting on the lever 29. The effect of this is that, with increasing master cylinder pressure, plunger 37 still shuttles to seat and unseat ball 43 but that increase in master cylinder pressure at port 27 cause equal increases in brake pressure at port 28.

The characteristics of the braking system is shown in FIG. 6 of the accompanying drawings as a graph of inboard brake pressure versus master cylinder pressure for various centripetal accelerations. It can be seen that at the higher cornering acceleration the inboard brake provides a degree of braking which is fairly close to the ideal characteristics shown in FIG. 2.

The characteristics of the system are substantially the same with decreasing master cylinder pressure and with increasing or decreasing cornering acceleration. There is a difference in the working of the second valve 26 in that if master cylinder pressure is decreasing or if cornering acceleration is increasing the valve plunger 37 moves towards the first valve 23 to reduce the pressure at outlet port 28 without the non-return valve opening. The resultant movement of lever 29, if the plunger is in contact, alters the spring bias slightly but not enough to alter the general characteristic.

Since the system is symmetrical, operation for cornering with the second front wheel 16 as the outboard wheel is exactly similar to that described above for cornering with the first front wheel 15 as the outboard wheel.

The crank arms 33 and 34 can be connected to the rear suspension of the vehicle if installation so demands since the system described is required to be sensitive to the roll of the vehicle and does not depend on the variations in wheel loading due to other causes. In a vehicle with fluid suspension the lever 29 can be operated by actuators sensitive to pressure in suspension struts on opposite sides of the vehicle to provide a biassing load which is proportional to cornering acceleration.

To minimise mechanical wear the plungers may be modified to have slotted ends which abut each other, the lever 29 working in the slots. The housings 36 and 38 may be integral with each other and may also be integral with the pivot of the level 29.

I claim:

1. In a vehicle having a body supported by a resilient suspension system, a first wheel on one side of the vehicle and a second wheel on the other side of the vehicle, a first suspension component which moves with vertical movement of the first wheel relative to the vehicle body and a second suspension component which moves with vertical movement of the second wheel relative to the vehicle body, a fluid pressure braking system which comprises:

a driver-controlled source of fluid pressure;
  a first brake operative to brake said first wheel;
  a second brake operative to brake said second wheel;
  a first brake actuator acting on said first brake;
  a second brake actuator acting on said second brake;
  a first pressure reducing valve interposed between said source and said first brake actuator;
  and a second pressure reducing valve interposed between said source and said brake actuator, each pressure reducing valve comprising a housing, an inlet port connected to said source, an outlet port connected to the respective one of said first and second brake actuators, a normally open non-return valve allowing flow from the outlet port to the inlet port and a plunger movable in one direction with respect to the housing by brake pressure at the outlet port acting on a relatively large piston area of the plunger and in the other direction by source pressure at the inlet port acting on a relatively small piston area of the plunger, movement of the plunger in said one direction beyond a predetermined position allowing the non-return valve to close and block communication from the inlet port to the outlet port, the reducing valves being arranged such that the plunger of each reducing valve acts to oppose movement of the plunger of the other reducing valve in the respective one direction;
  and a resilient linkage operably connected to said first and second suspension components and to said first and second reducing valves to bias the plunger of said first reducing valve in the respective other direction when the weight carried by said first wheel is greater than that carried by said second wheel and to bias the plunger of said second reducing valve in the respective other direction when the weight carried by said second wheel is greater than that carried by said first wheel.

2. The braking system of claim 1, wherein said reducing valves are aligned such that the plunger of each reducing valve can apply a direct thrust to the plunger of the other reducing valve.

3. The braking system of claim 2, wherein the resilient linkage comprises a lever which is interposed between the plungers in the respective other directions.

4. The braking system of claim 3, wherein the resilient linkage further comprises a first spring which connects the lever to said first suspension component and a second spring which connects the lever to said second suspension component, the forces of the springs cancelling each other when the weights carried by the first and second wheels are the same.

* * * * *